Aug. 22, 1939.　　　A. G. HOPKINS　　　2,170,638

SOLDERED CAN SEAM AND METHOD OF MAKING SAME

Filed March 21, 1936

INVENTOR
Arthur G. Hopkins
BY
ATTORNEYS

Patented Aug. 22, 1939

2,170,638

UNITED STATES PATENT OFFICE 2,170,638

SOLDERED CAN SEAM AND METHOD OF MAKING SAME

Arthur G. Hopkins, Maspeth, N. Y., assignor to McKeesport Tin Plate Corporation, a corporation of Delaware Application March 21, 1936, Serial No. 70,064

5 Claims. (Cl. 113—112)

This invention relates to sheet metal cans, and more particularly to a soldered seam therefor, as well as a method for making the same.

Some of the objects of my invention are to generally improve sheet metal cans; to increase the strength of the can against rupture caused by internal pressure, without in any way complicating the process of manufacturing the can, or the apparatus needed to assemble and solder the can seam; and to improve the strength of the vertical or side seam in particular, by ensuring direct, ready flow and distribution of solder throughout the side seam. The conventional side seam comprises two reversely bent edges interlocked to form four thicknesses of metal with three solder spaces therebetween. In accordance with my invention, I cut solder admission slits through the external reversely bent edge, these slits being so located as to form direct solder flow paths to each of the three spaces to be soldered. The solder is fed by a suitable solder roller directly into the seam and through the slits. The short, direct and independent path of the solder to each of the three spaces being soldered is to be contrasted with the prior practice, in accordance with which the solder was compelled to flow through a devious and tortuous path formed by the said three spaces connected in series with sharp bends therebetween.

In accordance with further features and objects of my invention, the slits are formed without the actual removal of metal; the slits are so located as to facilitate a sharp and accurate bend of the edge of the blank; and a part of the metal adjacent the seam is left in unbent condition and subsequently functions as a solder-collecting lip, which facilitates the collection or removal of solder from the solder roll. Thorough saturation of the seam with solder is obtained even with high speed operation, and all past difficulty due to b'ocking by premature solidification of solder is obviated.

To the accomplishment of the foregoing and other objects which will hereinafter appear, my invention consists in the soldered seam elements and their relation one to another, as well as the method for forming the seam, as hereinafter are more particularly described in the specification and sought to be defined in the claims. The specification is accompanied by drawing in which:

Figure 7:
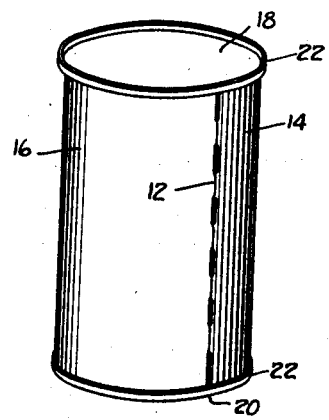
Fig. 7 is a perspective view of a cylindrical can having a side seam made in accordance with the invention.

Referring to the drawing, and more particularly to Fig. 7, the invention is shown applied to a side seam 12 of a cylindrical can 14, but it will be understood that the seam may be used for cans of different configuration. The can 14 is conventional in comprising a side wall 16 made of a single sheet of metal bent to cylindrical form, thus bringing two of the edges together at the seam 12 where they are interlocked and soldered to form a leak-proof joint. The ends 18 and 20 are added to the side wall 16 and secured thereto by appropriate rolled seams 22. The ends and end seams may in the present case be assumed to be conventional and to form no part of the present invention, the invention being illustrated as applied to the side seam 12.

Figure 1:
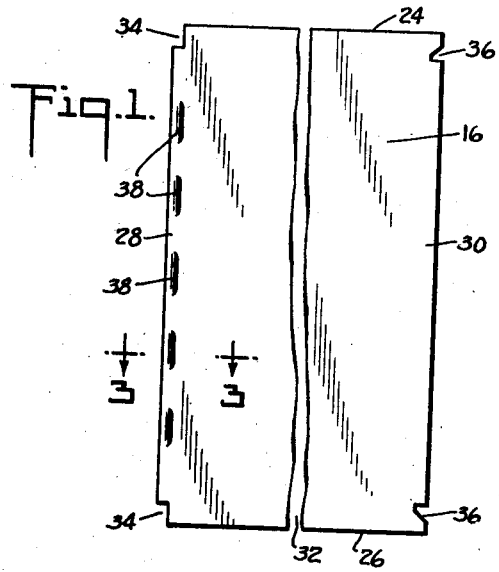
Fig. 1 shows a sheet metal blank preparatory to forming the side wall of the can.

The blank 16 forming the side wall of the can is illustrated in Fig. 1. The edges 24 and 26 correspond to the top and bottom of the can, while the edges 28 and 30 are joined to form the side seam 12. It will be understood that the distance between the edges 28 and 30 is much greater than that indicated on the drawing, the intermediate area of the blank being broken away as is indicated at 32 in order that the important parts of the structure may be shown to an enlarged scale.

Figure 3:
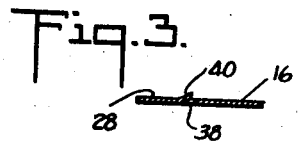
Fig. 3 is a section taken on the plane of the line 3—3 of Fig. 2.

The corners of the blank are notched at 34 and 36 in any desired or conventional manner, preferably to form a simple lapped seam at the top and bottom of the can, thereby facilitating subsequent seaming of the can ends to the side wall. In accordance with the present invention, the blank 16 is unique in being provided with a series of solder admission slits 38. In preferred form, these slits are aligned one with the other, and are disposed at the prospective fold line at the edge of the blank, that is, the slits are spaced inwardly from edge 26 an amount equal to the width of the fold or hook with which the blank is subsequently provided. An incidental advantage of this is that the incisions facilitate accurate folding of the blank at the intended fold line. The slits are simply incisions, and preferably no area of metal is removed. The configuration of the metal at the slits will be clear by reference to Fig 3, in which it will be seen that a part of the metal 40 at one side of the slit is displaced sidewardly slightly in order to accommodate the shearing movement of the metal at each side of the slit, and in order to properly open the slit in such a manner as to obtain a satisfactory solder admission opening when the blank is finished.

Figure 2:
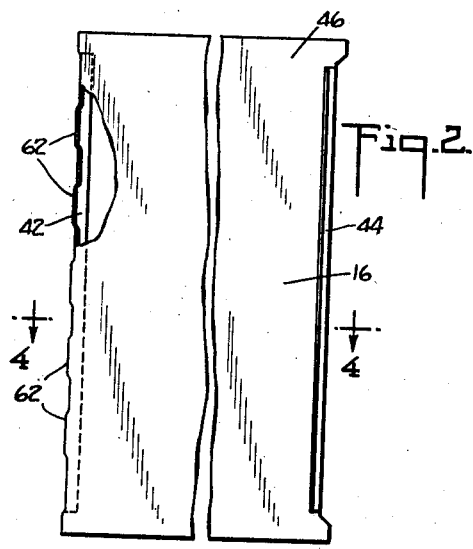
Fig. 2 illustrates the seam after the edges have been bent.
Figure 4:
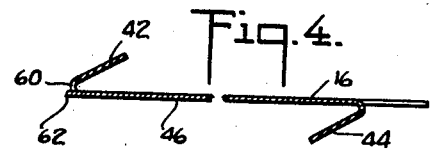
Fig. 4 is a section taken on the plane of the line 4—4 of Fig. 2.

The edge portions 28 and 30 of the blank are next folded, thus bringing the blank to the condition shown in Figs. 2 and 4, the folds or hooks at the ends of the blank being numbered 42 and 44. Fold 42 is preferably made inwardly of the blank and forms the outer hook of the seam, and fold 44 is made outwardly and forms the inner hook of the seam. The surface 46 in Fig. 4 or the surface facing the reader when looking at Fig. 2, is the outer surface of the blank. This surface may be appropriately lithographed to properly identify the product and its maker, while the inner surface may be lacquered or otherwise treated for protection of the contents of the can. The incised fold, that is, fold 42, must be made inward and the other fold made outward, in order to bring the solder admission slits on the exterior of the can, for it is most convenient and conventional to feed solder to the seam from outside the can.

Figure 5:
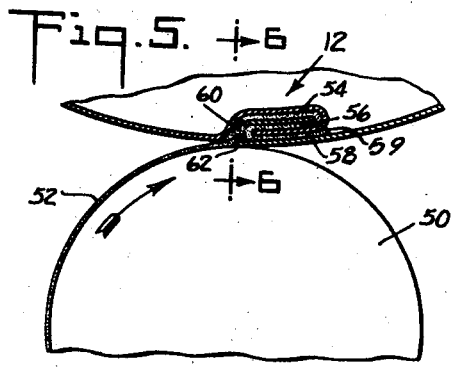
Fig. 5 is a section through a seam being soldered in accordance with features of my invention.

The blank 16 is then bent to cylindrical form, and folded edges 42 and 44 are hooked together in accordance with known practice in can manufacture. The resulting open-ended cylinder is moved through appropriate soldering mechanism, schematically indicated in section in Fig. 5. The mechanism includes a support or horn, not shown in the drawing, along which a series of can cylinders are moved axially. At this time the seam is disposed at the bottom, as is indicated in Fig. 5, and solder is applied thereto by means of a solder roll 50 running in a bath of molten solder, a film of which is carried upwardly on solder roll 50 and fed to the seam, as is indicated at 52. The seam generally indicated by the numeral 12, comprises in this instance four layers of metal having three solder spaces therebetween in both the slitted and contiguous unslitted regions of the seam, these spaces being numbered 54, 56 and 58, respectively. In accordance with prior practice, the solder carried upwardly by solder roll 50 flows upwardly to the solder space 54. The solder can reach the next space 56 only by first traversing space 54. Similarly, the solder can reach the third space 58 only by first traversing spaces 54 and 56 in series. The length and deviousness of the solder path, the sharp bends and the obstruction formed by the tendency of the solder to solidify, have all tended to prevent thorough saturation of the seam with solder. Some suggestion has been made for venting the seam, but this is only partially helpful in that it may facilitate the flow of solder through part of the seam, for example the first solder space 54; it does not, however, improve the flow of solder to the remaining solder spaces.

In accordance with the present invention, the incisions 38 form solder admission slits 60 best shown in Figs. 4 and 5, and these slits are so disposed as to communicate directly with the two solder spaces 56 and 58 located within the outer hook at the slitted regions of the seam and thence into these two solder spaces in the unslitted regions, providing therefor direct and parallel passages for solder flow. Thus solder flow paths are provided which are in addition to the normal solder flow into the third or innermost solder space 54. As the solder roll rotates and carries its supply of solder transversely against the edge of the seam, the solder flows into and through the three spaces 54, 56 and 58 in parallel rather than in series, and all of these spaces receive a full and adequate supply of solder in minimum time and with minimum resistance, forming a triple solder seal for the seam. It will be noted that the solder flows readily into the solder space 58, not only filling the same completely, but forming a secure mechanical seal at the innermost regions thereof, where the solder forms a sealing fillet 59.

Reverting to Figs. 2 and 4, it should be noted that because of the manner in which the edge of the blank is slit and subsequently bent, one edge of the slit is displaced or carried inwardly relative to the other, thus leaving an outwardly projecting lip 62. This lip projects appreciably from the bent edge of the blank even before the blank is rolled to cylindrical form, and the outward projection of the lip is slightly increased after the blank is rolled to cylindrical form, for the lip tends to remain straight or tangential. This lip functions in a manner self-evident from inspection of Fig. 5, for it comes close to or contacts the solder roll 50, and acts as a solder-collecting lip, which wipes solder from the solder roll as the roll with its film of solder is moved against the lip.

Figure 6:
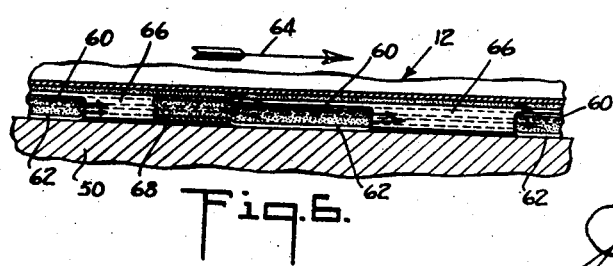
Fig. 6 is an enlarged fragmentary section taken in the plane of the line 6—6 of Fig. 5, and is explanatory of a feature of my invention.

As is shown in Figs. 1, 2 and 7, the incisions along the seam are preferably made substantial in length. I recommend that approximately half the seam length be incised, or in other words, that the incisions approximately equal or even slightly exceed the length of the spaces therebetween. With this proportioning of parts, the entire seam is thoroughly saturated with solder, including not only the incised, but also the nonincised parts of the seam. This results not only from natural flow or spread of solder within the seam, but also because of the axial movement of the can cylinder with respect to the solder roll. Thus, referring to Fig. 6, the seam 12 is moved to the right, as is indicated by the arrow 64. The solder roll 50 rotates, but does not move axially. The solder admission slits are clearly shown at 60, as well as the solder-collecting lips 62 therebeneath. The parts of the seam not incised are indicated at 66, one of these parts being partially sectioned at 68. The copious supply of solder collected by lips 62 and flowing into the windows 60, flows in opposite directions, as indicated by the double arrows in Fig. 6, thus quickly filling the portions 66 of the seam.

It is believed that the improved can seam of my invention, as well as the method of forming the same, and the many advantages thereof, will be apparent from the foregoing detailed description. It will also be apparent that while I have shown and described the invention in a preferred form, many changes and modifications may be made in the structure disclosed, without departing from the spirit of the invention defined in the following claims.

I claim:

1. In the manufacture of a soldered metal seam for sheet metal cans or the like, the method which consists in forming two reversely disposed hook edges, one to define an outer hook and the other an inner hook, the outer hook being provided at its bend with a plurality of spaced substantially long slits extending along the bend, and in interlocking said hook edges to form the seam, whereby the said seam has four thicknesses of metal with three intervening solder spaces in both its slitted and contiguous unslitted regions and whereby the slits, defining solder entrant openings, communicate directly with the two solder spaces within the outer hook at the slitted region and thence into said two solder spaces in the unslitted regions, providing therefor direct and parallel passages for solder flow; and then feeding solder from the outside directly into said seam, whereby solder is supplied to said two solder spaces and to the innermost or third solder space by three short direct paths.

2. The method of claim 1 wherein the outer hook is produced by the steps consisting of sltting the sheet metal blank at the intended bend of the outer hook and then folding the blank along its slit line.

3. In the manufacture of a soldered metal seam for sheet metal cans or the like, the method which consists in forming two reversely disposed hook edges, one to define an outer hook and the other an inner hook, the outer hook being provided at its bend with spaced substantially long slits extending along the bend, the cumulative length of the slits being about half the seam length, the outer edges of the slits extending outwardly to form solder collecting lips, and interlocking said hook edges to form the seam, whereby the said seam has four thicknesses of metal with three intervening solder spaces in both its slitted and contiguous unslitted regions and whereby the slits, defining solder entrant openings, communicate directly with the two solder spaces within the outer hook at the slitted region and thence into said two solder spaces in the unslitted regions, providing therefor direct and parallel passages for solder flow; and then feeding solder from the outside directly into said seam, whereby solder is supplied to said two solder spaces and to the innermost or third solder space by three short direct paths.

4. A metal seam for sheet metal cans or the like, said seam comprising two interlocked reversely disposed hook edges, one defining an outer hook and the other an inner hook, the outer hook being provided at its bend with a plurality of spaced substantially long slits extending along the bend, the said seam having four thicknesses of metal with three intervening solder spaces in both its slitted and contiguous unslitted regions, the said slits, defining solder entrant openings, communicating directly with the two solder spaces within the outer hook at the slitted region and thence into said two solder spaces in the unslitted regions and providing therefor direct and parallel passages for solder flow, whereby when solder is fed from the outside into said seam the solder is supplied to said two solder spaces and the innermost or third solder space by three short direct paths.

5. A metal seam for sheet metal cans or the like, said seam comprising two interlocked reversely disposed hook edges, one defining an outer hook and the other an inner hook, the outer hook being provided at its bend with a plurality of substantially long slits extending along the bend, the cumulative length of the slits being about half the seam length, the outer edges of the slits projecting outwardly to form solder collecting lips and the slits occupying approximately half the length of the seam, the said seam having four thicknesses of metal with three intervening solder spaces in both its slitted and contiguous unslitted regions, the said slits, defining solder entrant openings, communicating directly with the two solder spaces within the outer hook at the slitted region and thence into said two solder spaces in the unslitted regions and providing therefor direct and parallel passages for solder flow, whereby when solder is fed from the outside into said seam the solder is supplied to said two solder spaces and the innermost or third solder space by three short direct paths.

ARTHUR G. HOPKINS.